United States Patent

Hilsum et al.

[11] 3,944,817
[45] Mar. 16, 1976

[54] OPTICAL INTENSITY ADJUSTMENT DEVICES

[75] Inventors: Cyril Hilsum, Malvern; Frederick Alistair Johnson, Powick; Edward Peter Raynes, Worcester, all of England

[73] Assignee: National Research Development Corporation, London, England

[22] Filed: Nov. 8, 1973

[21] Appl. No.: 414,097

[30] Foreign Application Priority Data
Nov. 9, 1972 United Kingdom............... 51697/72

[52] U.S. Cl. .......... 250/213 VT; 250/229; 250/227; 350/160 LC; 178/7.82; 178/DIG. 29
[51] Int. Cl.² ......................................... H01J 31/50
[58] Field of Search ............. 250/213 VT, 229, 227; 178/DIG. 29, 7.82; 350/160 LC; 23/23 LC

[56] References Cited
UNITED STATES PATENTS

| | | |
|---|---|---|
| 3,019,344 | 1/1962 | Seidman et al............ 250/213 VT X |
| 3,121,796 | 2/1964 | Reed ............................ 250/213 VT |
| 3,576,393 | 4/1971 | Thompson .................. 178/DIG. 29 |
| 3,586,773 | 6/1971 | Niemyer, Jr. et al. ........ 178/DIG. 29 |
| 3,631,252 | 12/1971 | Gebel............................. 250/229 X |
| 3,691,302 | 9/1972 | Gaeble et al................. 178/DIG. 29 |
| 3,694,659 | 9/1972 | Ramsay et al............... 250/213 VT |
| 3,731,986 | 5/1973 | Fergason .................. 350/160 LC X |
| 3,792,284 | 2/1974 | Kaelin............................... 250/227 |

OTHER PUBLICATIONS

Schadt et al., Applied Physics Letters; Vol. 18; No. 4; 2/15/71; pp. 127, 128.
Aviram et al., IBM Technical Disclosure Bulletin; Vol. 14, No. 11, Apr. 1972; pp. 3536, 3537.
Friedman: IBM Technical Disclosure Bulletin; Vol. 8; No. 1, June 1965; p. 120.

*Primary Examiner*—Walter Stolwein
*Attorney, Agent, or Firm*—Cushman, Darby & Cushman

[57] ABSTRACT

An optical intensity adjustment device for adjusting the intensity of optical radiation incident thereon includes a first transparent conducting electrode, a second transparent conducting electrode, a layer of a twisted nematic liquid crystal material contained between the first electrode and the second electrode, an optical polarisation polariser located adjacent to the first electrode for linearly polarising optical radiation incident on the said layer, via the first electrode, an optical polarisation analyser located adjacent to the second electrode for analysing the plane of polarisation of optical radiation emergent from the said layer, means for applying a voltage between the first electrode and the second electrode and, electrically connected to said means for applying a voltage, photoelectric means for sampling the intensity of optical radiation incident on the device and for allowing the voltage applied between the first electrode and the second electrode to be adjusted in response to a change in the intensity of optical radiation sampled by the photoelectric means. The device may be incorporated within and as part of an optical image intensifier or a television camera.

11 Claims, 10 Drawing Figures

OPTICAL INTENSITY ADJUSTMENT DEVICES

The present invention relates to optical intensity adjustment devices.

Certain devices which process optical radiation over a wide range of intensities, for example television cameras or optical image intensifiers, are normally protected against exposure to optical radiation which is too intense by means of a manually adjusted stop. However, in conditions where the intensity level of the radiation can change quickly, harm can be done to the device by exposure to intense radiation if the stop is not adjusted in time. For example, if an image intensifier is used during night-time the maximum intensity of radiation incident on the image intensifier will normally stay at a reasonable level. However, if the light from car headlights for instance is suddenly incident unintentionally on the image intensifier the sudden rise in intensity can cause the image intensifier to be damaged. A similar situation, but in which the effect is not so pronounced, is experienced when dawn rises. Although an operator would normally anticipate dawn rising and adjust the stop accordingly, the possibility exists, particularly after long use or if the operator is inexperienced, that he might forget to use the stop and allow the device to be exposed to radiation having too high an intensity.

Furthermore, in certain situations it is necessary for the device to detect an image which is much more intense in one part than another. The intense part of the processed image can sometimes be harmful to the device. Also, if the output from the device results in a visual image, that visual image can sometimes be generally unacceptable. For example, one such situation is experienced in the televising of outdoor events in mid-Summer. There can be a very noticeable difference in contrast when part of the event takes place in very bright sunlight whilst another part takes place contemporaneously in a region of shadow.

There is, therefore, a requirement for an automatic intensity adjustment device, i.e. a stop, which can be used in conjunction with optical processing systems such as television cameras or image intensifiers and which, preferably, can be arranged to adjust the intensity of only certain parts of an optical image incident on, or received by, the optical processing device.

According to the present invention, there is provided an optical intensity adjustment device for adjusting the intensity of optical radiation incident thereon including a first transparent conducting electrode, a second transparent conducting electrode, a layer of a twisted nematic liquid crystal material contained between the first electrode and the second electrode, an optical polarisation polariser located adjacent to the first electrode for linearly polarising optical radiation incident on the said layer via the first electrode, an optical polarisation analyser located adjacent to the second electrode for analysing the plane of polarisation of optical radiation emergent from the said layer, means for applying a voltage between the first electrode and the second electrode, and, electrically connected to the means for applying a voltage, photoelectric means for sampling the intensity of optical radiation incident on the device and for allowing the voltage applied between the first electrode and the second electrode to be adjusted in response to a change in the intensity of optical radiation sampled by the photoelectric means.

'Twisted nematic liquid crystal material' is intended to include material which is not itself naturally nematic but which is structurally identical to a nematic material whose molecular arrangement is adjusted to have a twist therein.

The optical intensity adjustment device may, for example, be used to adjust the intensity of optical radiation incident on or received by an image intensifier or a television camera or incident on the human eye, i.e. in order to reduce flashes from such sources as welding arcs.

The photoelectric means may include one region or a plurality of regions of photoconductive material arranged in electrical series with the layer of liquid crystal material. Alternatively, the photoelectric means may include a photovoltaic cell.

Embodiments of the present invention will be described by way of example with reference to the accompanying drawings, in which.

Figure 1A:
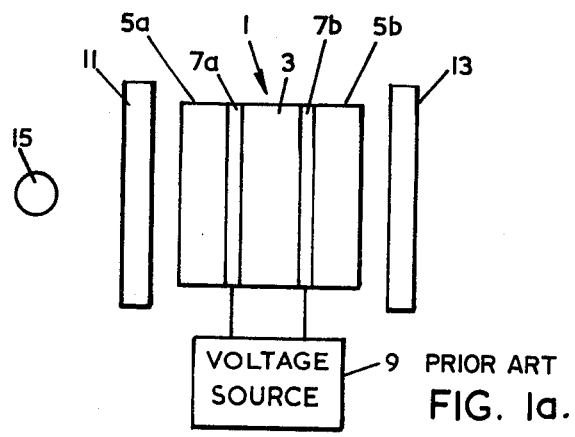
FIG. 1a is a schematic plan view of an arrangement which can be used for observing the voltage dependent optical activity of a twisted nematic liquid crystal.

Liquid crystal materials are materials which consist of organic liquids in which the molecules are arranged over limited ranges in an ordered structure. There are a number of different types of liquid crystals and a number of electro-optic effects which can be obtained with them.

The present invention is an application of the so-called 'twisted nematic effect' in which a specially arranged nematic or equivalent liquid crystal material exhibits a voltage dependent optical activity.

A nematic liquid crystal is one in which all the molecules point in the same direction. A cell containing a nematic liquid crystal and for observing electro-optic effects obtained therewith may be formed by the following simple method. Two glass plates are coated with transparent conducting material. The plates are rubbed in one (the same) direction with a suitable soft fabric material such as cotton wool. A thin layer of the nematic liquid crystal material is then deposited between the plates which are arranged to be parallel. The direction of the molecules of the liquid crystal tend to follow the direction of the rub and a single nematic liquid crystal is obtained.

A cell for observing the twisted nematic effect can be obtained in a similar way, but the direction of rub on one of the plates is made different, normally by 90°, from that on the other so that the direction in which the molecules of the material point, the direction vector, twists progressively in the plane of the plates between the direction of rub on one plate and the direction of rub on the other. In other words, the 'direction vector' of the molecules varies progressively to form part of a turn of a helix. The liquid crystal (material) so formed is known as a 'twisted nematic' liquid crystal although the material used to form it is not necessarily itself nematic in its natural state.

In order to obtain voltage dependent optical activity with a twisted nematic liquid crystal formed in the way described there is one further requirement of the liquid crystal. It must be a particular material whose dielectric anisotropy, i.e. the difference between the dielectric constant measured parallel to the molecule and that measured perpendicular to the molecules, is positive.

A cell containing a twisted nematic liquid crystal having a positive dielectric anisotropy is optically active. If linearly (plane) polarised light is incident on the cell in a direction normal to the glass plates the plane of polarisation will rotate as it passes through the liquid crystal provided that when it reaches the liquid crystal its polarisation is parallel to the molecules of the liquid crystal. A 90° twist in the direction in which the molecules point leads to a 90° twist in the rotation of the plane of polarisation of the light. A voltage applied across the cell between the transparent conducting electrodes causes realignment of the molecules of the liquid crystal so that they tend to follow the direction of the electric field. This realignment causes the optical activity to be reduced. Therefore, if a twisted nematic liquid crystal cell is placed between an optical polariser appropriately arranged to polarise light parallel to the molecules at the near surface of the liquid crystal and an optical polarisation analyser, the intensity of light transmitted from the polariser through the cell and the analyser can be varied by varying the voltage applied across the cell.

FIG. 1a is a schematic plan view of an arrangement suitable for observing the voltage dependent optical activity of a twisted nematic liquid crystal. A cell 1 prepared as described above consists of a twisted nematic liquid crystal 3 sandwiched between glass plates 5a, 5b having on their inner faces transparent conducting coatings 7a, 7b respectively, which are made for example of tin oxide. Alternatively the glass plates 5a, 5b may have fine wire grid coatings. The liquid crystal material is conveniently one which exhibits a nematic liquid crystal phase at room temperature. One nematic liquid crystalline material which exhibits such a phase and which has a large positive dielectric anisotropy is the compound pentyl-cyano-biphenyl

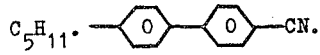

A variable voltage may be applied across the cell by a voltage source 9 connected between the transparent conducting coating 7a and the transparent conducting coating 7b. An optical polariser 11 is located in front of the glass plate 5a and an optical polarisation analyser 13 is located behind the glass plate 5b. Alternatively polarising film may be affixed to the glass plates to form the polariser 11 and the analyser 13. A source 15 of light is located in front of the polariser 11.

Figure 1B:
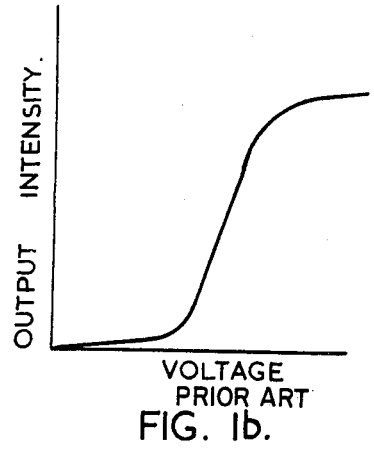
FIG. 1b is a graph of the intensity of light output from the apparatus described with reference to FIG. 1a plotted against the voltage applied when a polariser and an analyser used in the apparatus are set to pass light having the same plane of polarisation.

FIG. 1b is a graph of the output intensity of light originating from the source 15 after passing through the analyser 13 described with reference to FIG. 1a plotted against the voltage applied across the cell 1 when the polariser 11 and analyser 13 are set to pass light having planes of polarisation which are the same as one another, i.e. are set 'parallel'. When the voltage applied by the voltage source 9 is low the optical activity of the liquid crystal 3 of the cell 1 is significant and light polarised by the polariser 11 is rotated by the liquid crystal 3 and is not transmitted through the analyser 13. However, as the voltage is increased the optical activity of the liquid crystal 3 is reduced and the transmission through the analyser 13 is increased. For voltages above a particular level the optical activity of the cell 1 is a minimum and the transmission through the analyser 13 is a steady maximum.

Figure 1C:
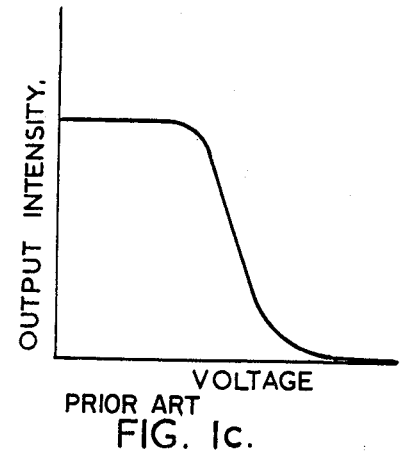
FIG. 1c is a graph of the intensity of light output from the apparatus described with reference to FIG. 1a plotted against the voltage applied when the polariser and the analyser are set crossed.

FIG. 1c is a graph of the output intensity of light originating from the source 15 after passing through the analyser 13 described with reference to FIG. 1 plotted against the voltage applied across the cell 1 when the polariser 11 and the analyser 13 are set crossed with one another. When the voltage is low the optical activity of the liquid crystal 3 of the cell 1 is high and light polarised by the polariser 11 is practically all rotated by 90° and transmitted through the analyser 13. However, as the voltage is increased the optical activity of the cell 1 is reduced and the transmission through the analyser 13 is reduced until above a particular voltage level the transmission through the analyser 13 falls to a minimum.

The resent invention is concerned with an optical intensity adjustment device making use of the voltage dependent optical activity effect described above with reference to FIGS. 1a, 1b and 1c.

Figure 2:
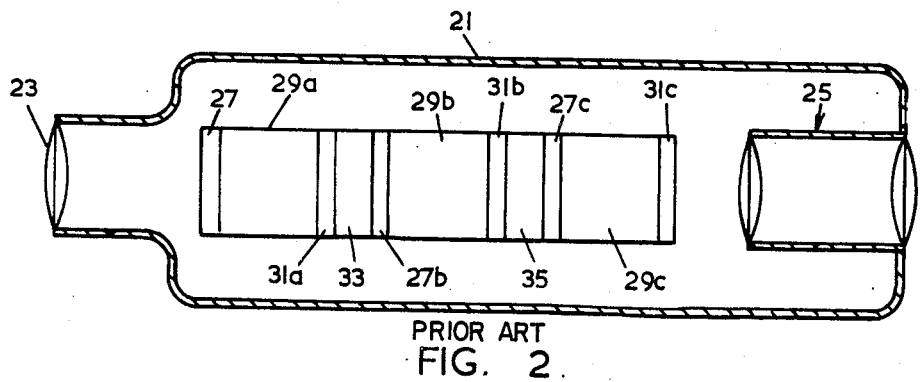
FIG. 2 is a schematic cross-sectional diagram of a conventional image intensifier.

FIG. 2 is a schematic cross-sectional diagram of a conventional image intensifier to which an optical intensity adjustment device embodying the present invention may be attached as described below. The image intensifier consists of a generally light-tight compartment 21 having a lens 23 at one end and a viewing telescope 25 at the other end. Light from a scene and incident on the lens 23 is focussed on the active part of the image intensifier. The active parts consist of a number of intensifying stages (three of which are illustrated) each of which contains a photocathode, which generates electrons in a pattern corresponding to the intensity pattern of light incident on the photo-cathode, a vacuum tube of which the photo-cathode forms one end and a phosphor, which forms an anode, at the other end of the vacuum tube. In the device illustrated in FIG. 2, the first stage consists of a vacuum tube 29a having a photocathode 27a and a phosphor 31a, the second stage consists of a vacuum tube 29b having a photocathode 27b and a phosphor 31b, and the third stage consists of a vacuum tube 29c having a photocathode 27c and a phosphor 31c. The phosphor 31a of the first stage is optically connected to the photocathode 27b of the second stage by means of a plate 33 made from a plurality of fibre-optic guide elements. The phosphor 31b of the second stage is optically connected to the photocathode 27c of the third stage by means of a plate 35 also made from a plurality of fibre-optic guide elements.

In action the image incident on the photocathode 27a is intensified by being converted into electrons at the photocathode 27a and then converted back into an optical image at the phosphor 31a. A further intensification occurs at each further stage. The intensified image on the phosphor 31c of the final stage is viewed through the viewing telescope 25. The photocathode 25a of the first stage may be responsive to infra-red radiation so that the first stage is used to convert the infra-red radiation into visible light.

The image intensifier described with reference to FIG. 2 would conventionally include a manually adjusted stop (not shown) and would, therefore, suffer from the disadvantage outlined above, namely the possibility of damage caused by exposure to radiation of high intensity.

Figure 3:
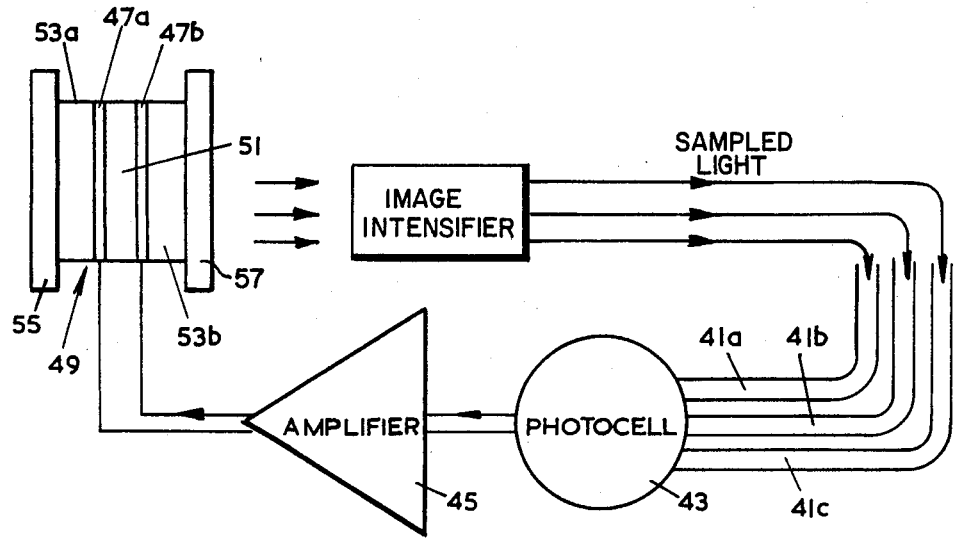
FIG. 3 is a schematic diagram of an optical intensity adjustment device embodying the present invention.

FIG. 3 is a schematic diagram of an optical intensity adjustment device embodying the present invention which is arranged to operate in conjunction with the image intensifier described with reference to FIG. 2 and which takes advantage of the voltage dependent optical activity effect described with reference to FIGS. 1a, 1b and 1c. Light incident on the phosphor 31c (FIG. 2) is sampled by fibre-optic guides 41a, 41b and 41c, . . . connected to suitable points (not shown) on the phosphor 31c. The sampled light is guided by the fibre-optic guides 41a, 41b, 41c to a photoelectric cell 43, for example a metal-semiconductor photovoltaic cell. The photo-electric cell 43 is arranged (in a known way) to provide a single output signal corresponding to the most intense light detected. The electrical signal generated by the photo-electric cell 43 is amplified at an amplifier 45. The output of the amplifier is applied between transparent conducting electrodes 47a, 47b of a cell 49 similar to the cell 1 described above with reference to FIG. 1a. The transparent conducting electrodes of the cell 49 are electrodes 47a, 47b; both may consist of a grid of fine wires of a non-transparent material. The cell 49 also contains a twisted nematic liquid crystal 51, which may be pentyl-cyano-biphenyl located between the glass plates 53a, 53b. The electrodes 47a, 47b are deposited on the inner surfaces of the glass plates 53a and 53b respectively. The cell 49 is located between an optical polariser 55 adjacent to the glass plate 53a and an optical polarisation analyser 57 located adjacent to the glass plate 53b.

The cell 49, the polariser 55 and the analyser 57 are located in front of the lens 23 described with reference to FIG. 2. The polariser 55 and the analyser 57 are set crossed with one another. As the light passing through the phosphor 31c increases, so there is a corresponding increase in the voltage developed as an output of the amplifier 45. This voltage when applied across the liquid crystal 51 of the cell 49 causes the intensity of light transmitted by the optical polarisation analyser 57 to be reduced. Thus the device described with reference to FIG. 3 continuously monitors the intensity level of light incident on and intensified by the image intensifier and adjusts the intensity of light incident on the lens 23 whenever a sudden increase in the intensity of the light from the given scene occurs.

The circuits of the amplifier 45 and the photoelectric cell 43 may be set in a known way so that the cell 49 only affects incident light when that light is above a given threshold level.

Figure 4:
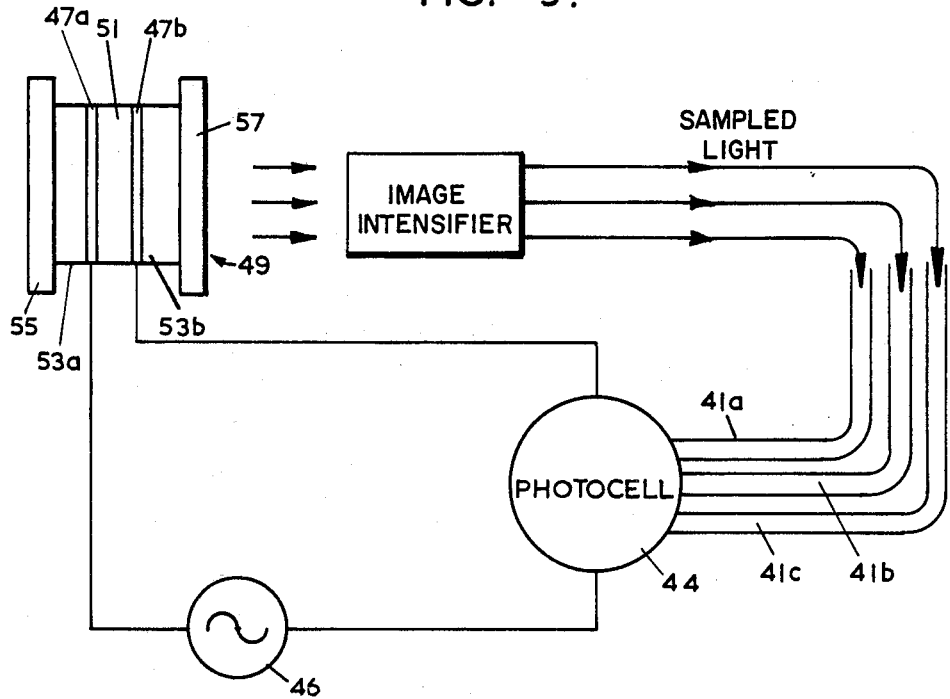
FIG. 4 is a schematic diagram of an alternative optical intensity adjustment device embodying the present invention

FIG. 4 is aschematic diagram of an alternative optical intensity adjustment device embodying the present invention. The device is a modification of that described with reference to FIG. 3. The photo-electric cell 43 is replaced by a photo-electric cell 44 which consists of a photo-conductor such as cadmium sulphide. The amplifier 45 is replaced by a source 46 of alternating current which is connected in an electrical circuit including the photo-electric cell 44 and the electrodes 47a, 47b and the twisted nematic liquid crystal 51 of the cell 49.

The device described with reference to FIG. 4 operates in a manner similar to that of the device described with reference to FIG. 3. The level of the current supplied by the source 46 is initially adjusted until there is maximum optical activity exhibited by the cell 49 with no light incident on the photocell 44. When light is sampled by the fibre optic guides 41a, 41b and 41c the electrical resistance of the photoelectric cell 44 is reduced. The peak voltage applied across the twisted nematic liquid crystal 51 is therefore increased, causing the same effect to occur as that described in connection with the device described with reference to FIG. 3, namely a reduction in the intensity of light passed through the analyser 57 owing to an increase in the optical activity of the twisted nematic liquid crystal 51.

It may be found convenient to locate the arrangement consisting of the polariser 55, the cell 49 and the analyser 57 in the devices described with reference to FIG. 3 and FIG. 4 between the first stage and the second stage of the image intensifier described with reference to FIG. 2.

Figure 5:
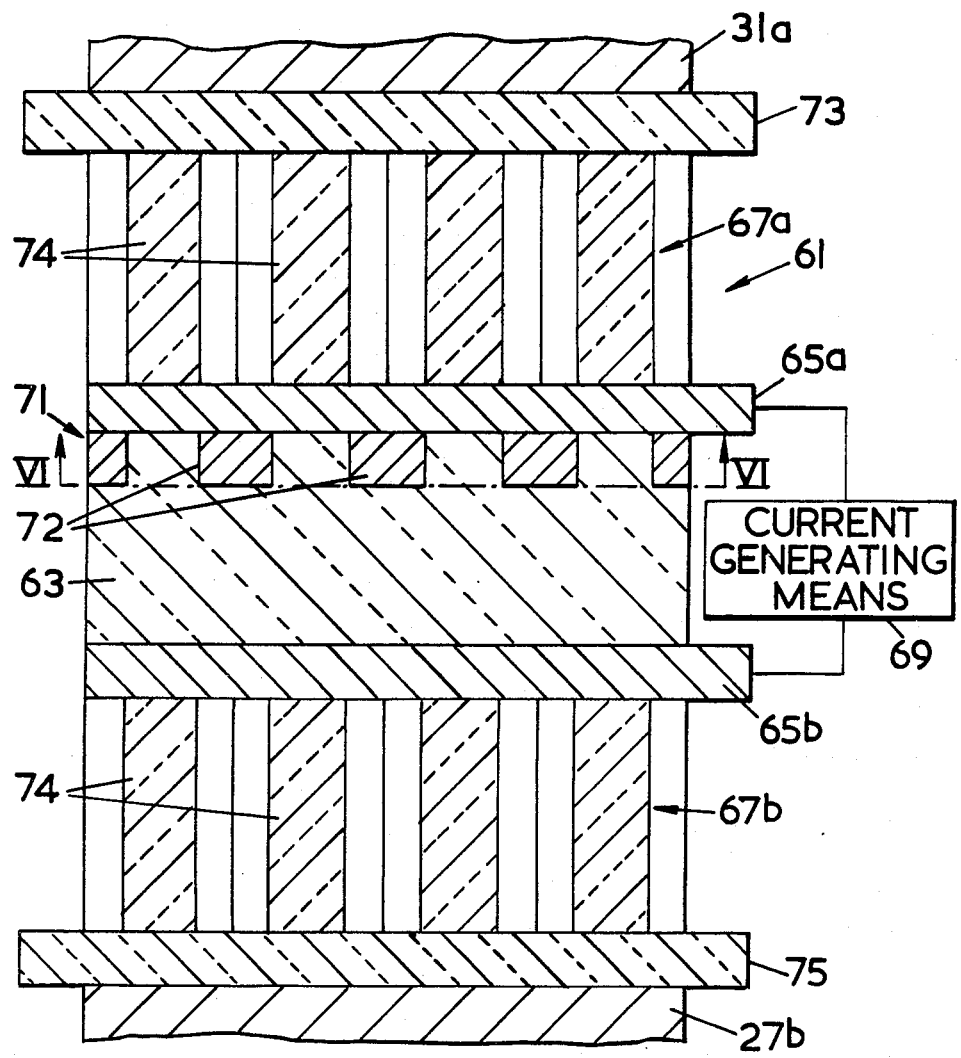
FIG. 5 is a cross-sectional diagram of an alternative optical intensity adjustment device embodying the present invention.

FIG. 5 is a cross-sectional diagram of an alternative intensity adjustment device embodying the present invention. The device consists of a composite structure which is located between the first and second stages of the image intensifier described with reference to FIG. 2, together with associated electric current generating means 69. The composite structure, which optically connects the phosphor 31a of the first stage with the photocathode 27b of the second stage, consists of a cell 61, similar to the cell 1 described with reference to FIG. 1, contained between an optical polarisation polariser 73 adjacent to the phosphor 31a and a rotatable optical polarisation analyser 75 set crossed with the polariser 73, adjacent to the photo-cathode 27b. The cell 61 contains a twisted nematic liquid crystal 63 which may be pentyl-cyano-biphenyl located between a transparent conducting electrode 65a and a transparent conducting electrode 65b, the electrode 65a being nearer the phosphor 31a. The electrodes 65a, 65b are connected to the current generating means 69. The cell 61 differs from the cell 1 in that the cell 61 contains instead of glass plates a fibre optic plate 67a forming the end of the cell 61 nearer the first stage and a fibre optic plate 67b forming the end of the cell 61 nearer the second stage. The fibre optic plates 67a, 67b both consist of a plurality of fibre optic guide elements 74 attached laterally together. The cell 61 also differs from the cell 1 in that the cell 61 contains a broken layer 71, consisting of an array of islands 72 of photoconductive material, such as cadmium sulphide, deposited between the electrode 65a and the liquid crystal 63.

The current generating means 69 may be used to generate either alternating or direct current. Connected to the current generating means 69 there exists an electrical circuit which includes the liquid crystal 63 in series with the layer 71 of photoconductive material. When the cell 61 receives low intensity light from the phosphor 31a, the electrical resistance of the photoconductive layer 71 is very high compared with that of the liquid crystal 63. However, when the light incident on one of the islands 72 of the photoconductive layer 72 is relatively intense the electrical resistance of that island is reduced by a great amount so that it becomes comparable with that of the liquid crystal 63, causing the voltage across the liquid crystal 63 to rise. The optical activity of the liquid crystal 63 is reduced by the effect described above and the intensity of light passed through the analyser 75 is consequently reduced.

The cell 61 is sensitive to, and can adjust the intensity of, particular areas of an image because the layer 71 of photoconductive material is broken to consist of the islands 72.

Figure 6:
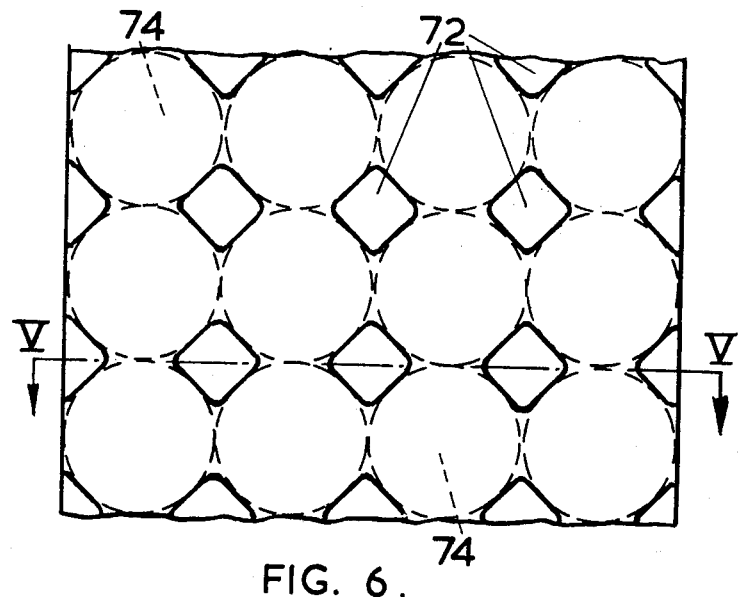
FIG. 6 is a cross-sectional diagram on the line V—V of the device described with reference to FIG. 5.

FIG. 6 is a cross-sectional diagram of part of the cell 61 described with reference to FIG. 5. FIG. 6 is a cross-sectional diagram on the line V—V in FIG. 5, (part of FIG. 5 being itself a cross-sectional diagram on the line VI—VI in FIG. 6). The islands 72 of the layer 71 of photoconductive material are deposited so that they lie facing separate interstices which occur between each set of four touching fibre-optic guide elements 74 in the plate 67a. In this way only a fraction of the light emerging from the electrode 65a falls on the islands 72 of the layer 71. Therefore the fraction transmitted to the photo-cathode 75 is still substantial. The light incident on the islands 72 of photoconductive material consists of the fraction of light laterally diffused from the ends of the fibre optic guide elements 74 of the plate 67a.

The arrangement described with reference to FIGS. 5 and 6 may alternatively be located between another two of the stages of the image intensifier described with reference to FIG. 2.

Figure 7:
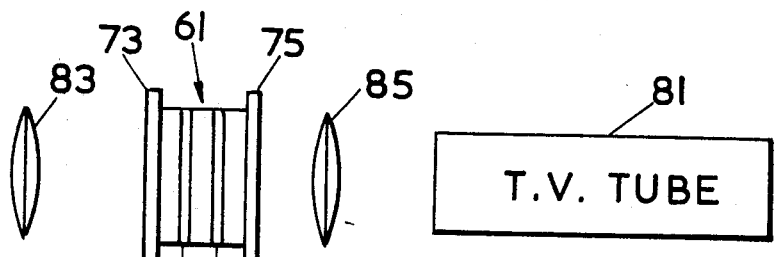
FIG. 7 and FIG. 8 are schematic plan views of alternative television cameras incorporating an optical intensity adjustment device embodying the present invention.

FIG. 7 is a schematic plan view of a television camera incorporating an optical intensity adjustment device embodying the present invention. The camera includes a conventional TV camera tube 81, a lens 83, a lens 85 and the composite structure described with reference to FIGS. 5 and 6, consisting of the cell 61, the polariser 73 and the analyser 75, together with the current generating means 69. The cell 61 is located at the focus of the lens 81. Divergent light leaving the cell 61 is refocussed by the lens 85 onto the front of the TV camera tube 81.

Operation is similar to that described in connection with the device described with reference to FIG. 5 and FIG. 6. When light incident on a part of the cell 61 is intense the resistance of the layer 71 of photo-conductive material is reduced causing a rise in the peak voltage applied across the twisted nematic liquid crystal 63 to occur. This voltage rise causes an increase in the optical activity of the cell 61 resulting in a reduction in the intensity of light passed by the analyser 75. Therefore the light focussed by the lens 85 onto the TV camera tube 81 is intensity-controlled.

Figure 8:
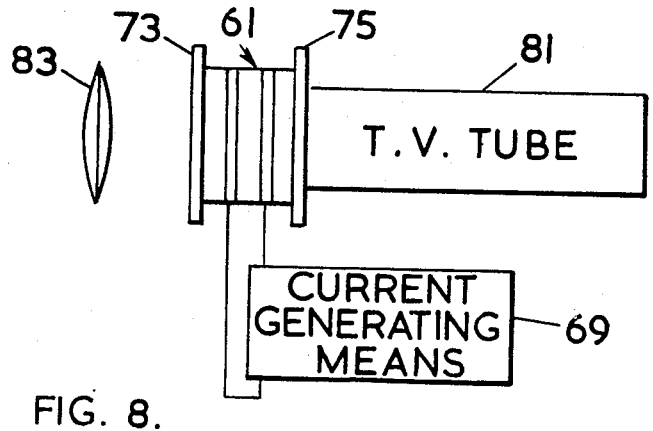

FIG. 8 is a schematic plan view of an alternative television camera incorporating an optical intensity adjustment device embodying the present invention. In this case the lens 85 illustrated in FIG. 7 has been removed and the composite structure consisting of the cell 61, the polariser 73 and the analyser 75 is located at the front of the TV camera tube 81 at the focus of the lens 83. This arrangement uses therefore only one lens instead of two.

Operation is similar to that of the camera described with reference to FIG. 7.

We claim:

1. An optical intensity adjustment device for adjusting the intensity of optical radiation incident thereon comprising a first transparent conducting electrode, a second transparent conducting electrode, a layer of a twisted nematic liquid crystal material contained between said first electrode and said second electrode, an optical polarization polarizer located adjacent to said first electrode for linearly polarizing optical radiation incident on said layer via said first electrode, an optical polarization analyzer located adjacent to said second electrode for analyzing the plane of polarization of optical radiation emergent from said layer, means for applying a voltage between said first electrode and said second electrode and, electrically connected to said means for applying a voltage, photoelectric means for sampling and providing adjustment of the intensity of optical radiation falling on said device, said photoelectric means comprising a photoconductive layer formed from a multiplicity of islands of a photoconductive material so physically disposed with respect to said layer of liquid crystal material that when optical radiation is incident on a localized region of said device said radiation causes the electrical resistance of said photoconductive layer in said localized region to fall and consequently causing said voltage to be applied mainly across said layer of liquid crystal material in said localized region to adjust the plane of polarization of said radiation in said localized region and reduce the intensity transmitted by said analyzer in said localized region.

2. A device as claimed in claim 1 and wherein said device is incorporated within and as part of the input system of an optical image intensifier.

3. A device as claimed in claim 1 and wherein said device is incorporated within and as part of the input system of a television camera.

4. A device as claimed in claim 1 and further comprising a plurality of fibre-optic guide elements arranged to guide radiation to be sampled to said photoelectric means.

5. A device as claimed in claim 2 and wherein said image intensifier comprises a plurality of intensifying stages and the arrangement comprising said first electrode, said second electrode, said layer, said polariser and said analyser is located in front of the first intensifying stage of said image intensifier and said photoelectric means is arranged to sample radiation emergent from one of said intensifying stages of the image intensifier.

6. A device as claimed in claim 2 and wherein said image intensifier comprises a plurality of intensifying stages and the arrangement comprising said first electrode, said second electrode, said layer, said polariser and said analyser is located between two of said intensifying stages of the image intensifier and said photoelectric means is arranged to sample radiation emergent from one of said intensifying stages of the image intensifier.

7. A device as claimed in claim 6 and wherein said arrangement is located behind said intensifying stage from which emergent radiation is sampled by the photoelectric means.

8. A device as claimed in claim 5 and further comprising a plurality of fibre optic guide elements arranged to guide radiation to be sampled to said photoelectric means.

9. A device as claimed in claim 7 and wherein said islands are physically attached to said first electrode and are located laterally to the ends of said fibre-optic guide elements.

10. A device as claimed in claim 9 and comprising the following arrangement located between two adjacent ones of said intensifying stages; said polariser attached to one of said intensifying stages and to said fibre-optic plate; said fibre-optic plate attached to said polariser and to said first electrode; said islands of photoconductor material deposited on the inner surface of said first electrode; said twisted nematic liquid crystal located between the inner surface of said first electrode and the inner surface of said second electrode; said analyser located between said second electrode and the other of said intensifying stages.

11. A device as claimed in claim 7 and comprising a transparent plate containing a plurality of fiber-optic guide elements said photoconductive islands being located adjacent to the ends of said fiber-optic guide elements.

* * * * *